Patented June 7, 1932

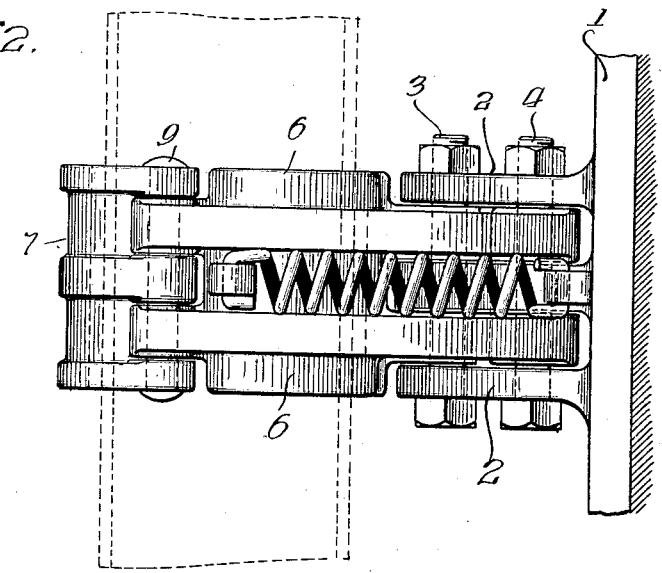
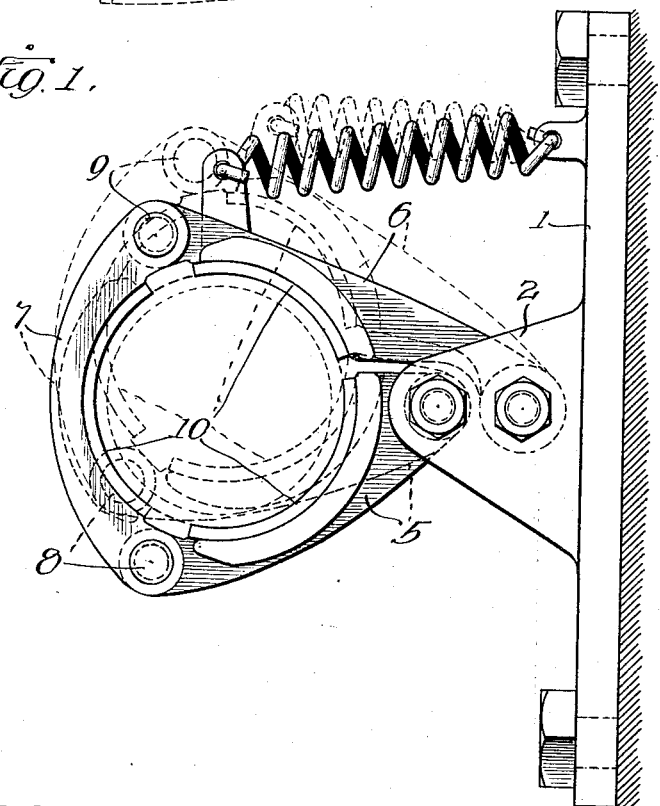

1,861,745

UNITED STATES PATENT OFFICE

FRANK H. KNEELAND, OF CHICAGO, ILLINOIS, ASSIGNOR TO SAFETY MINING COMPANY, OF CHICAGO, ILLINOIS, A CORPORATION

AUTOMATIC CLAMP

Application filed October 21, 1929. Serial No. 401,157.

The present invention relates to an improved form of vise or clamp adapted for the handling of relatively heavy cylindrical or substantially cylindrical bodies. The improved clamp is particularly adapted for use in the assembling and dismantling of heavy steel blasting cartridges.

It is an object of the invention to provide a vise of the character indicated which is self acting under the weight of an article placed therein and in which the clamping action is augmented by and in proportion to the turning force applied to the article.

In the drawing,

Figure 1 is a view in side elevation and
Figure 2 is a top plan view of the improved clamp.

The improved clamp or vice is provided with a suitable mounting bracket as indicated at 1. This bracket may take a variety of forms, but is preferably of such design as to be capable of mounting on an upright post or the like, although the form of the bracket in no way affects the action of the clamp. As shown, the bracket is provided with a pair of outwardly extending lugs 2, between which extend two spaced pivot pins 3 and 4. These pins are preferably arranged with their axes in the same horizontal plane. Pivotally mounted on the forward pin 3 is an arcuate link 5 which extends outwardly and downwardly therefrom. A similar link 6 is pivotally mounted on the pin 4 and extends outwardly and upwardly therefrom. The free ends of links 5 and 6 are pivotally connected by pins 8 and 9 to the respective ends of a third arcuate link 7. Each of these links is provided with an arcuate gripping surface 10 and the arrangement is such that in one position the several links cooperate to form a substantially perfect circle. This position lies between the normal inoperative position and the extreme operative or clamping position. A spring is provided having connection with a fixed anchorage and with one of the links such as the link 6 for the purpose of moving the assembly of links upwardly to distort and enlarge the circle.

A cylindrical object to be clamped may be inserted in the distorted opening formed by the several links while in inoperative position and under the weight of the article the assembly will be moved downwardly against the action of the spring to move the links toward that position in which they form a substantially perfect circle. Assuming that the object to be clamped is of substantially the same diameter as the perfect circle formed by the links when in their intermediate position, it will be apparent that the clamping action will start approximately at the point where the perfect circle is formed and that the action will be increased as the assembly is moved further downwardly to decrease the diameter of the circle. In this way the initial clamping action of the assembly of links is entirely automatic in response to the weight of an object placed therein. This clamping action is augmented by any appropriately directed turning force which may be applied to the clamped object after the links have contracted into engagement therewith. In order to remove the clamped article it is merely necessary to move the same together with the assembly of links in an upward direction to the point where the circle formed by the links is enlarged beyond the diameter of the normal circle.

The clamping action of a structure such as described above is positive and sufficiently powerful for all practical purposes. Also, due to the absence of any adjustment or control requiring manual operation, the improved clamp facilitates rapid work.

I claim:

1. A clamp comprising a support, a plurality of articulated links having complemental arcuate gripping surfaces and so arranged that in one position they form a substantially complete circle, means for normally moving said links to expand the circle and said links being responsive to the weight of a body positioned therein to move in opposition to said means and contract the circle.

2. A clamp comprising a support, a pair of horizontally arranged pivot pins thereon, a link pivotally mounted on each of said pins, a third link pivotally connected to the free ends of the first said links, the three said links having complemental arcuate gripping surfaces and so arranged that in one position they form a substantially complete circle, yieldable means for moving said links in a direction to distort and enlarge the circle, said links being responsive to the weight of a body positioned therein to move in opposition to said means and contract the circle.

3. A clamp comprising a support, a pair of pivot pins thereon arranged in the same horizontal plane and in spaced relation, a pair of links each having an end mounted on one of said pivot pins and extending outwardly therefrom for pivotal movement in a vertical plane, a third link having its ends pivotally connected with the free ends of the aforesaid links, the three said links having complemental arcuate gripping surfaces, the arrangement being such that in one position said surfaces form a substantially complete circle, yieldable means for moving said links upwardly whereby to distort and enlarge the circle, said links being responsive to any oppositely directed force to move in opposition to said means and contract the circle.

Signed at Chicago, Illinois, this 17th day of October, 1929.

FRANK H. KNEELAND.